(12) United States Patent
Keller

(10) Patent No.: US 9,996,463 B2
(45) Date of Patent: Jun. 12, 2018

(54) SELECTION AND PLACEMENT OF VOLUMES IN A STORAGE SYSTEM USING STRIPES

(71) Applicant: INTERNATIONAL BUSINESS MACHINES CORPORATION, Armonk, NY (US)

(72) Inventor: Michael Keller, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/937,685

(22) Filed: Nov. 10, 2015

(65) Prior Publication Data

US 2017/0132126 A1 May 11, 2017

(51) Int. Cl.
*G06F 12/00* (2006.01)
*G06F 13/00* (2006.01)
*G06F 13/28* (2006.01)
*G06F 12/06* (2006.01)
*G06F 11/34* (2006.01)

(52) U.S. Cl.
CPC .......... *G06F 12/0646* (2013.01); *G06F 11/34* (2013.01); *G06F 12/0653* (2013.01); *G06F 2212/1044* (2013.01)

(58) Field of Classification Search
CPC ......... G06F 11/1076; G06F 2211/1059; G06F 3/061; G06F 3/0619; G06F 3/064; G06F 3/0659; G06F 3/0688; G06F 12/0646; G06F 2212/1044; G06F 11/34; G06F 12/0653
USPC ........................................................ 711/171
See application file for complete search history.

(56) References Cited

U.S. PATENT DOCUMENTS

| 6,668,263 | B1 * | 12/2003 | Cranston ........... G06F 17/30595 |
| 7,085,953 | B1 * | 8/2006 | Hsu ..................... G06F 11/1076 714/5.11 |
| 7,617,370 | B2 | 11/2009 | Jernigan, IV et al. |
| 8,549,223 | B1 | 10/2013 | Kaliannan et al. |

(Continued)

FOREIGN PATENT DOCUMENTS

JP  5291456  9/2013

OTHER PUBLICATIONS

Abu-Libdeh, et al., "RACS: A Case for Cloud Storage Diversity", ACM, Proceedings of the 1st ACM symposium on Cloud computing, Jun. 10-11, 2010, pp. 229-240.

(Continued)

*Primary Examiner* — Sheng-Jen Tsai
(74) *Attorney, Agent, or Firm* — David W. Victor; Konrad, Raynes, Davda and Victor LLP

(57) ABSTRACT

Provided are a computer program product, system, and method for determining the location for volumes of data being initially stored within a storage space, regardless of the physical location of the data. The storage space includes stripes composed of volumes, which can be logically represented as a utilization histogram of stripe locations offset from one another. Sometime the stripes are fully allocated with one large volume or partially allocated with multiple, arbitrary-sized smaller volumes. When there are multiple smaller volumes that do not utilize all of the available stripe space, gaps form. To minimize the creation of such gaps, when a volume of data is initially stored, a start location to place the volume of data is selected by using selection criteria as guidance.

14 Claims, 5 Drawing Sheets

(56) References Cited

U.S. PATENT DOCUMENTS

| | | | |
|---|---|---|---|
| 8,627,181 B1* | 1/2014 | Ito | G06F 11/108 |
| | | | 714/773 |
| 8,918,609 B2 | 12/2014 | Iwamitsu et al. | |
| 9,049,137 B1* | 6/2015 | Markine | H04L 12/18 |
| 9,069,471 B2* | 6/2015 | Nakano | G06F 3/0613 |
| 9,229,657 B1* | 1/2016 | Rus | G06F 3/0643 |
| 2006/0248273 A1* | 11/2006 | Jernigan, IV | G06F 3/061 |
| | | | 711/114 |
| 2007/0233993 A1* | 10/2007 | Kato | G06F 3/0608 |
| | | | 711/170 |
| 2008/0243860 A1* | 10/2008 | Cannon | G06F 3/0608 |
| 2014/0075148 A1* | 3/2014 | Bello | G06F 12/1036 |
| | | | 711/206 |
| 2014/0108759 A1* | 4/2014 | Iwamitsu | G06F 3/0604 |
| | | | 711/165 |
| 2014/0164695 A1* | 6/2014 | Sun | G06F 11/10 |
| | | | 711/114 |
| 2014/0195760 A1 | 7/2014 | Iwamitsu et al. | |
| 2014/0208024 A1* | 7/2014 | Simionescu | G06F 3/061 |
| | | | 711/114 |
| 2014/0337321 A1* | 11/2014 | Coyote | G06F 3/0482 |
| | | | 707/722 |
| 2015/0199235 A1 | 7/2015 | Fiske et al. | |
| 2015/0293717 A1* | 10/2015 | Kesavan | G06F 3/0656 |
| | | | 711/114 |

OTHER PUBLICATIONS

"Optimized Deduplication Metadata Online Redistribution", IP.com, Prior Art Database Technical Disclosure, IP.com No. 000228925D, 2013, pp. 1-7.
U.S. Pat. No. 7,617,370 is the English Counterpart for JP5291456.
Publication 2006/0248273 is the English Counterpart for JP5291456.
U.S. Pat. No. 8,918,609 is the English Counterpart for IN1544DELNP2015.
Publication 2014/0108759 is the English Counterpart for IN1544DELNP2015.
Publication 2014/0195760 the English Counterpart for IN1544DELNP2015.
English Abstract for IN1544DELNP2015, published Jul. 3, 2015, Total 2 pages.

* cited by examiner

SELECTION AND PLACEMENT OF VOLUMES IN A STORAGE SYSTEM USING STRIPES

BACKGROUND OF THE INVENTION

1. Field of the Invention

The present invention relates to a computer program product, system, and method for the initial selection and placement of volumes in a storage system using stripes.

2. Description of the Related Art

In software-defined computing (SDC), a computing infrastructure is virtualized and delivered as a service. For example, in a software-defined storage (SDS) system, storage hardware is separated from software that manages the storage infrastructure. In SDS, the software managing a software-defined storage environment may also provide policy management for features such as de-duplication, replication, snapshots and backup. In such a computing infrastructure, requests to add data may result in volumes of data being placed at various locations in the storage portion of the infrastructure, potentially fragmenting the storage portion. Fragmented data is difficult to consolidate as time progresses. There is a need in the art for improved techniques for maximizing SDS system utilization without burdening the system with extra processing during system operation to minimize fragmentation in the storage portion of the infrastructure.

SUMMARY

Provided are a computer program product, system, and method for managing storage volumes of a storage system. They include a process for determining, by a volume placement module, a start location for placing a storage volume in the storage system. Further, the storage system includes at least one storage device and also includes a process for selecting, by the volume placement module, a location among more than one start location to optimize the utilization of allocated storage space of the at least one storage device, such that the selection includes evaluating selection criteria based on a current volume allocation within the storage space of the at least one storage device.

In a system for managing storage volumes of a storage system, the system includes a processor and a memory for executing processes of a manager module. The manager module determines at least one start location for placing a storage volume in the storage system, such that the storage system includes at least one storage device. The manager module also selects a start location to optimize the utilization of allocated storage space of the at least one storage device, such that the selection includes evaluating selection criteria based on a current volume allocation within the storage space of the at least one storage device.

In a method for managing storage volumes of a storage system, the system includes an operation for determining, by a volume placement module, at least one start location for placing a storage volume in the storage system, such that the storage system includes at least one storage device. A further operation includes selecting, by the volume placement module, a start location to optimize the utilization of allocated storage space of the at least one storage device. The selection includes evaluating selection criteria based on a current volume allocation within the storage space of the at least one storage device

DETAILED DESCRIPTION

Many Storage Area Network (SAN) products (both storage arrays and software defined storage), scale-out Network-Attached Storage (NAS) solutions, or object-based storage solutions, use a grid architecture. A fundamental property of these architectures is that they attempt to stripe user volumes across many physical storage devices dispersed in the grid architecture. Described embodiments provide techniques for determining the starting location for volumes of data being initially stored within a storage space, regardless of the physical location of the data. The storage space includes stripes composed of volumes, which can be logically represented as a utilization histogram of stripe locations offset from one another. Sometime the stripes are fully allocated with one large volume or partially allocated with multiple, arbitrary-sized smaller volumes.

However, when there are multiple smaller volumes that do not utilize all of the available stripe space, gaps form. To minimize the creation of such gaps, when a volume of data is initially stored, an embodiment of the invention determines the best (at that point in time), or as near optimal as possible, location to place the volume of data. Embodiments of the invention use selection criteria as guidance when examining the utilization histogram. Selection criteria includes (1) preventing peaks of storage blocks in the stripe utilization histogram, thus minimizing the creation of deep valleys of gaps, (2) leveling the stripes, or reducing the number of stripe edges, further decreasing gaps, and (3) trying to fill the lowest open gap in a stripe utilization histogram, thus filling the oldest gaps.

The problem of minimizing gaps, if not handled at the start of placing a volume in storage, is that non-contiguous volumes with gaps in-between them require cleaning up/defragmenting at a later time. While naively it is possible to place the start of a new volume where the last volume ended, volume resizes, deletions, and volume movement create gaps during normal storage system operation. Accordingly, it is advantageous that these gaps are filled using embodiments of the present invention, which maximizes storage utilization, while avoiding the computer processing overhead of moving previously stored volumes at a later time, to reduce the gaps. It should be appreciated that embodiments of the present invention can be practiced in any storage system architecture, such as a software-defined storage (SDS) system, SAN, clustered NAS, and a standalone storage system, among others, without departing from the scope of the invention described herein.

Figure 1:
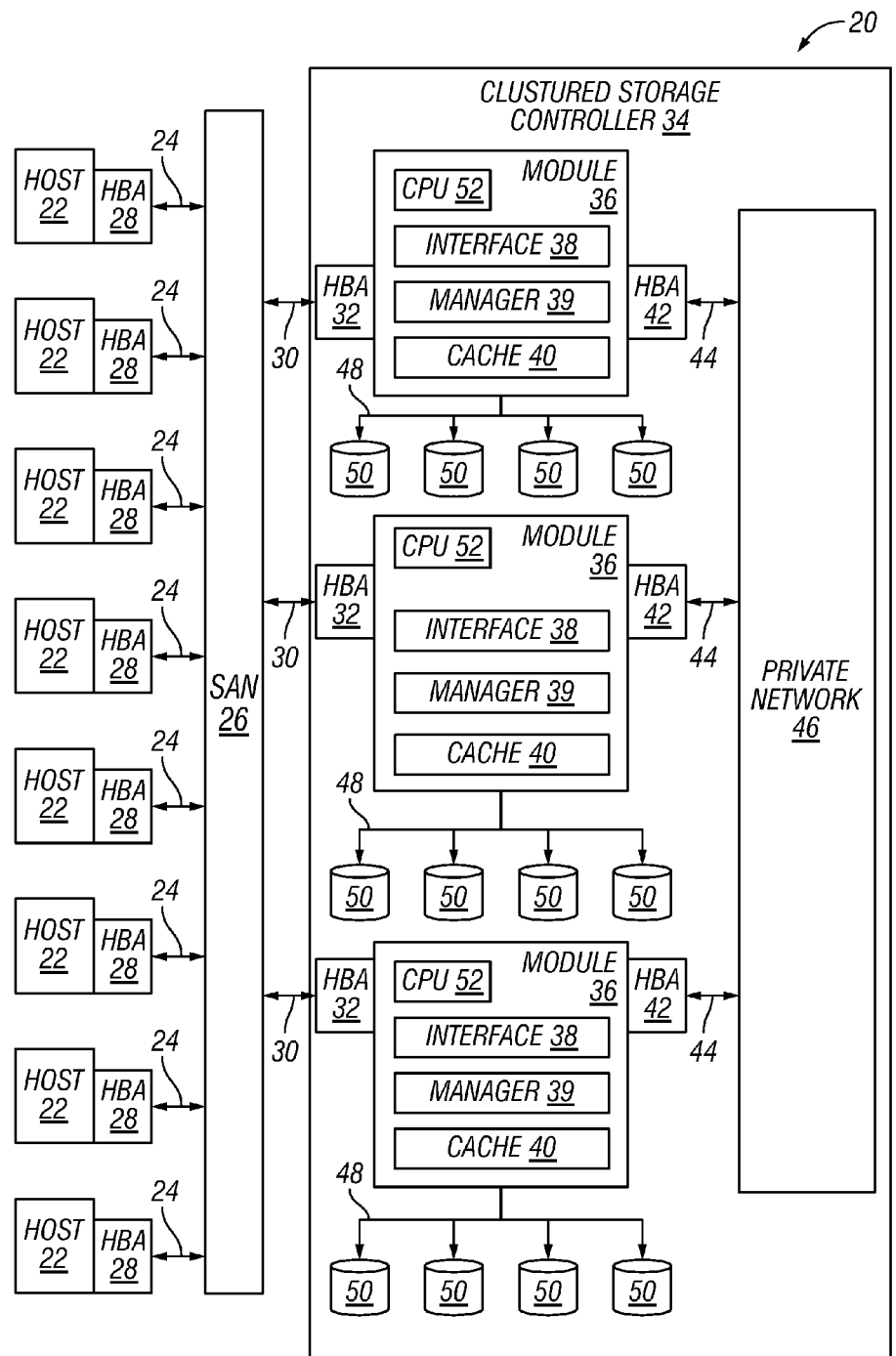
FIG. 1 is a block diagram that schematically illustrates a storage system comprising a storage controller having multiple modules configured to place storage volumes for management by a software defined computing system, in accordance with an embodiment of the present invention.

FIG. 1 is a block diagram that schematically illustrates a storage system comprising a storage controller having multiple modules configured to place storage volumes for management by a software defined computing system, in accordance with an embodiment of the present invention. Specifically, FIG. 1 is a block diagram that schematically illustrates a data processing storage subsystem 20 of a grid storage system. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities. For example, other implementations incorporating the invention include a non-software-defined computing (SDC) computing infrastructure, such as a cluster of non-virtualized storage system nodes.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Using the network, any host computer 22 can communicate a request to add a new volume to the storage subsystem 20. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system. It should be appreciated that unified storage systems storing data blocks and/or files are also contemplated in other embodiments of the present invention.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 38 (in communication between adapters 32 and 42), a manager 39, and a cache 40. Each storage module 36 is responsible for a number of storage devices 50 by way of a data connection 48 as shown. In embodiments of the present invention, the manager 39 includes at least one logical module that determines where to initially place volumes after implementing the selection criteria previously described.

Each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising three modules 36 and each of the modules coupled to four storage devices 50, a given storage controller 34 comprising any multiple of modules 36 coupled to any plurality of storage devices 50 is considered to be with the spirit and scope of the present invention.

Figure 2:
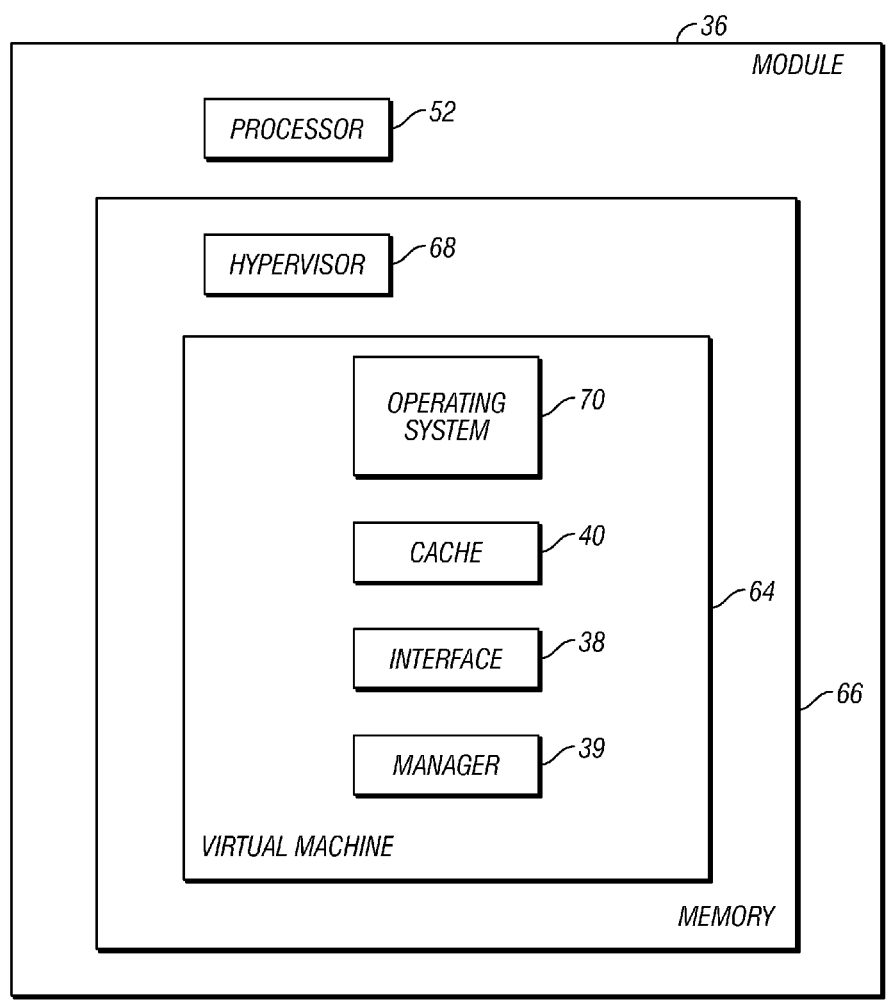
FIG. 2 is a diagram that schematically illustrates a module configured to provide management services for the software defined computing system, in accordance with an embodiment of the present invention.

FIG. 2 is a diagram that schematically illustrates a module configured to provide management services for the software defined computing system, in accordance with an embodiment of the present invention. Specifically, the diagram schematically illustrates a module 36 configured to execute the manager 39 that enables the selection of an initial starting location to place a volume of data. In addition to processor 52, module 36 comprises a memory 66 that stores a hypervisor that the processor executes in order to create and manage virtual machine 64 that is also stored in memory 66. In the configuration shown in FIG. 2, storage service virtual machine 64 comprises a service operating system 70, cache 40, manager 39, and interface 38. It should be appreciated by those skilled in the art that any type of hypervisor provided by any vendor for managing virtual machines is contemplated by embodiments of the invention. In operation, virtual machine 64 can be configured as a "light weight" virtual machine that is either pre-deployed or deployed when needed by hypervisor 68.

When a request is made to initially store data, the virtual machine 64 receiving the request organizes the data into a new volume. The new volume can be represented as blocks of data, as previously described with respect to FIG. 1. Next, the manager 39 of the virtual machine 64 analyzes the state of the allocated and available storage space. This state is logically represented by a histogram, which represents numerically at a point in time of new volume allocation, the utilized portions of the storage space within stripes. A stripe may include one or more volumes of various sizes. In an embodiment of the present invention, the stripe may be fixed, such as being 100 GB in size. The stripe may also be larger or smaller. Regardless of the stripe size, a volume may have a small size, such as 10 GB. If only one volume is allocated within a single stripe, then 90 GB of storage is left unallocated and a 90 GB gap appears.

Accordingly, a utilization histogram shows the locations of previously allocated stripes. The utilization histogram also includes the locations of the gaps that have developed. The manager 39 analyzes all available starting locations for the new volume and selects the best starting location for the new volume using one or more of the selection criteria previously described. Finally, the utilization histogram also shows a slice, which is a vertical representation of blocks of data. The component blocks of the slice can exist in one or more stripes (the horizontal representation of blocks).

Figure 3A:
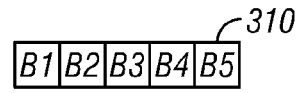
FIG. 3A is a diagram that schematically illustrates logical placement of a volume within a utilization histogram for the software defined computing system, in accordance with an embodiment of the present invention.
Figure 3A:
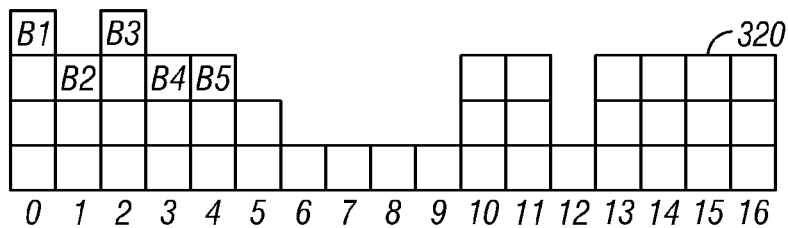

FIG. 3A is a diagram that schematically illustrates logical placement of a volume within a utilization histogram for the software defined computing system, in accordance with an embodiment of the present invention. It should be appreciated that the utilization histograms illustrated herein are examples, which can vary for other implementations incorporating the present invention. A new volume 310, composed of a partition of five blocks of data (B1 through B5), is shown as an example. Those of ordinary skill in the art will recognize that a volume can have any number of blocks, or groups of data. For example, files can be grouped in volumes and grouped in blocks. In a utilization histogram 320 of FIG. 3A, a stripe size can be eight blocks long. Thus, at the lowest level (bottom-most, row 1) of the utilization histogram 320, stripe-1 from offset location 0 through 7, is filled with blocks. Stripe-2 from offset location 8-15, is filled with data blocks. Stripe-3, also filled with data blocks, starts at offset location 16 (row 1) and wraps upward to the next higher row, from offset location 0 though 6(row 2). Thus, the stripes are logically offset from one another in a contiguous fashion from bottom to top and left to right in a circular path.

Specifically, in FIG. 3A, the utilization histogram 320 illustrates the logical allocation of the previously allocated data blocks within the slices and the current gaps. The manager module from FIGS. 1 and 2 maintains, or creates as needed, the utilization histogram 320 and updates the utilization histogram 320 after adding new volumes. If the manager chooses the first possible starting location at offset location 0, highest empty row (at row 4), to place data block B1 (while maintaining data block continuity), then subsequently, the manager chooses the starting offset location at offset location 1 for data block B2, offset location 2 for data block B3, and offset location 3 for data blocks B4 and B5. Being opportunistic, the manager easily selected offset location 0 (row 4) as the first available space to start adding the new volume 310. However, the gaps starting at offset location 5 (row 3), offset location 6 (row 2), and offset location 12 (rows 2 and 3) continue to exist. Also, if placed in this starting location, the new volume addition would increase the maximum slice utilization to 4 blocks, in slices 0 and 2.

If instead, the manager considers selection criteria of (1) preventing peaks of storage blocks in the stripe utilization histogram, thus minimizing the creation of deep valleys of gaps, (2) leveling the stripes, or reducing the number of stripe edges, further decreasing gaps, and (3) trying to fill the lowest open gap in a stripe utilization histogram, thus filling the oldest gaps, another starting offset location can be chosen to minimize gaps.

Figure 3B:
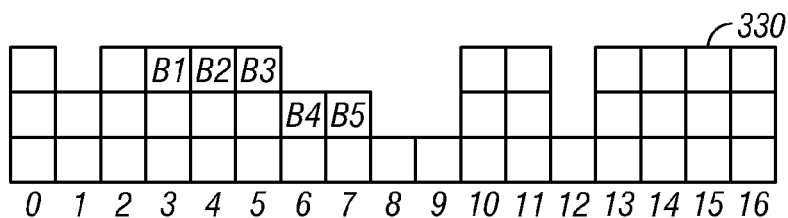
FIG. 3B is a diagram that schematically illustrates improved logical placement of a volume within a utilization histogram for the software defined computing system, in accordance with an embodiment of the present invention.

FIG. 3B is a diagram that schematically illustrates improved logical placement of the new volume 310 within a utilization histogram 330 for the software defined computing system, in accordance with an embodiment of the present invention. Specifically, the manager examines all the possible starting offset locations, including offset location 0 (row 4), offset location 1 (row 3), offset location 2 (row 4), offset location 3 (row3), offset location 6 (row 2), offset location 10 (row 4), offset location 12 (row 2) and offset location 13 (row 4). The manager determines a value for each selection criteria, aggregates the values into a score, and chooses the highest score corresponding to the best possible starting offset location. For example, values for one selection criteria, such as preventing peaks of storage blocks in the utilization histogram, yields a low value for offset locations 0, 2, 10, and 13 because they all begin at row 4. Offset locations 8 and 12 yield the highest values. It should be appreciated the values can be implemented in any fashion, such as lower row numbers having higher values within a given value range. In this example, row 1 (bottom-most) can have a value of 4 while row 4 may have a value of 1. Those of ordinary skill in the art will recognize that any other valuation method can be used without departing from the spirit of the present invention.

Now, considering the other selection criteria of reducing the number of stripe edges and trying to fill the lowest, oldest open gap in a stripe utilization histogram, values can also be assigned for each possible starting offset location. A stripe edge is any falling edge such as illustrated in FIG. 3B from offset location 0 (row 4) to offset location 1 (row 3) and a rising edge from offset location 1 (row 3) to offset location 2 (row 4). The oldest gaps start at offset locations 8 and 12 at row 2. If offset location 1 (row 3) is selected for data block B1 (not shown), the subsequent data block B2 will be placed at offset location 2 (row 4), thus creating a peak and more edges. To minimize edges and reduce peaks, the manager chooses offset location 3 (row 3) as the starting offset location for data block B1. Consequently, data blocks B2 and B3 are placed at the same row as data block B1 and data block B4 is placed at offset location 6, thereby reducing two edges. The first reduced falling edge is from offset location 2 to offset location 3 and the second reduced falling edge is from offset location 5 to offset location 6.

Figure 3C:
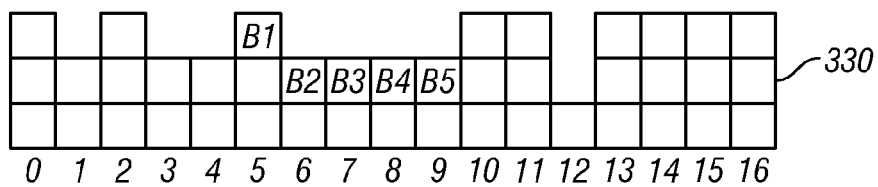
FIG. 3C is a diagram that schematically illustrates optimal logical placement of a volume within a utilization histogram for the software defined computing system, in accordance with an embodiment of the present invention.

Although it is possible to use none or some of the selection criteria, the near optimal result for reducing gaps when initially storing a new volume is shown in FIG. 3C. Specifically, FIG. 3C is a diagram that schematically illustrates optimal, or near optimal logical placement of the new volume 310 within a utilization histogram 330 for the software defined computing system, in accordance with an embodiment of the present invention. By also accounting for trying to fill the lowest gaps, the manager now chooses starting offset location 5, row 3 for data block B1, and filling the lowest gap from offset locations 6 through 9 on row 2 with data blocks B2 through B5, respectively.

Figure 4:
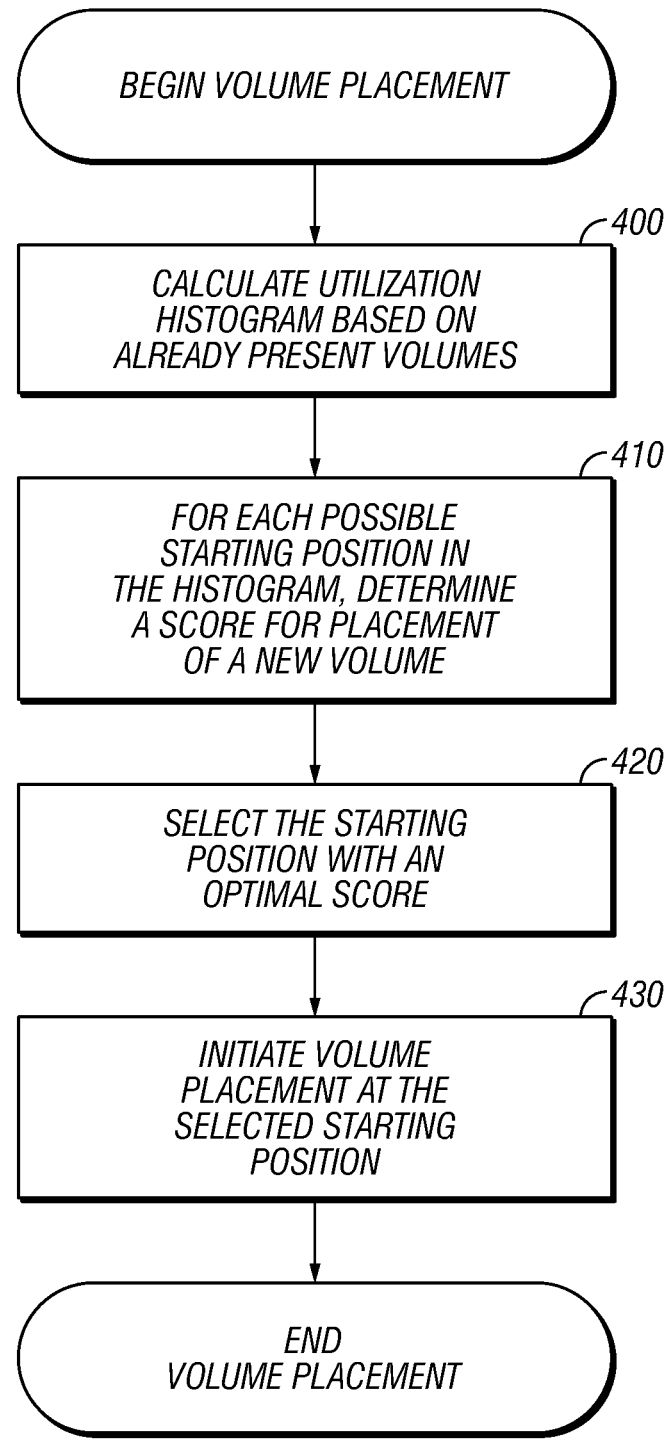
FIG. 4 is a flow diagram that schematically illustrates a method of optimally placing a storage volume at an optimal location for the software defined computing system, in accordance with an embodiment of the preset invention.

FIG. 4 is a flow diagram that schematically illustrates a method of optimally placing a storage volume at an optimal location for the software defined computing system, in accordance with an embodiment of the preset invention. In particular, in a method implemented by software or firmware, the manager includes a volume placement module. The volume placement module can operate dynamically during system runtime or initiate as needed, such as when a new volume needs to be allocated to a storage space. Upon receipt of a request to add a new volume, the volume placement module at operation 400 calculates a utilization histogram based on already present volumes. In other embodiments, the utilization histogram can pre-exist and illustrate the current state of the present volumes, this obviating the need for a calculation. In operation 410, the volume placement module, for each possible starting position in the histogram, determines a score for placement of a new volume.

Formally, to describe the selection criteria with respect to determining the scores, the already provisioned capacity of the storage system can be represented as a histogram over all the slices of the storage system. For the fixed number of slices N, the numbers $h_1, \ldots, h_N$ represent the total number of units in each slice provisioned to volumes in the system. If a volume of size s (in slice units) is added to this histogram at start slice b, then slices in the cyclic range (b, (b+s) mod N) are increased by ceil(s/N), while all other slices are increased by floor(s/N). When calculating the score, the selection criteria are also described formally as goals of the scoring algorithm.

The new volume allocation should avoid increasing the most utilized, or least free slice, even where such an allocation would increase utilization of a very underutilized slice nearby. If f represents the number of units of free space in the most utilized slice, the goal is to avoid decreasing f, which is a top goal of one embodiment. Additionally, the new volume allocation should attempt to minimize the variance (peaks and valleys) displayed by of the histogram. Finally, the new volume allocation should attempt to "close edges", or at least reduce their height. Once again, formally, for the start slice b or end slice e, represent e=(s+b) mod N where e can be chosen such that the difference $h_b - h_{b-1}$ and/or $h_e - h_{e-1}$ are reduced, then the scoring algorithm should consider closing edges.

These three goals can conflict in discrete examples, so therefore, the values from analyzing the goals are normalized, weighted, and added up to a score. This score then measures the positive effect on the histogram for given histogram H before the addition, b, the slice offset of the new volume, and s, the size of the new volume. The method executed by the volume placement module then compares the score for all N possible values of b, and chooses the value of b yielding the highest score. The selection of b, which is the highest possible score, is performed by the volume placement module in operation 420. Thereafter, in operation 430, the volume placement module, via the manager of FIGS. 1 and 2, initiates volume placement at the selected starting location and the process ends until a new volume storage request arrives for processing.

Figure 5:
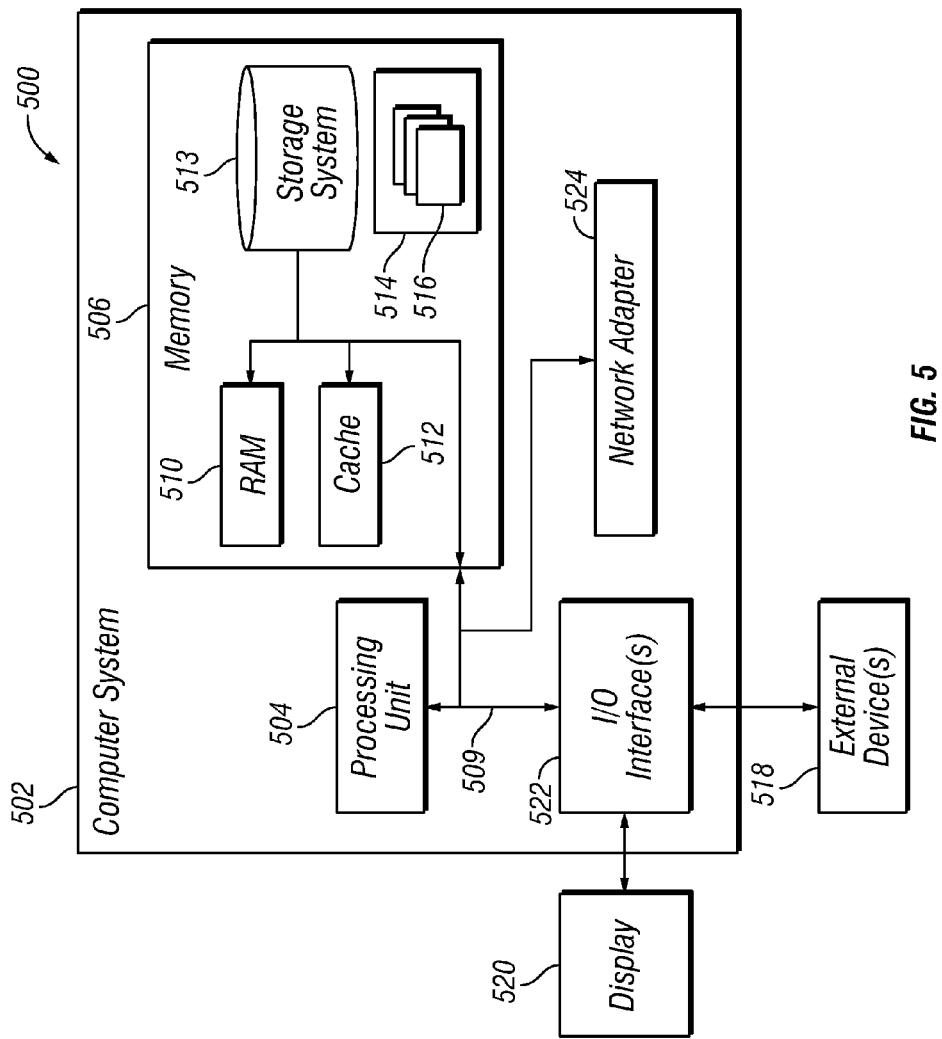
FIG. 5 illustrates a computing environment in which the components of FIGS. 1 and 2 may be implemented.

FIG. 5 illustrates a computing environment in which the components of FIGS. 1 and 2 may be implemented. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

The computational components of FIGS. 1 and 2 may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 is shown in the form of a general-purpose computing device. The components of computer system/server 502 may include, but are not limited to, one or more processors or processing units 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. It should be appreciated that RAM may be implemented as Dynamic RAM (DRAM), Static DRAM (SDRAM), storage-class memory (SCM), Phase Change Memory (PCM), resistive random access memory (RRAM), spin transfer torque memory (STM-RAM), conductive bridging RAM (CBRAM), etc.

Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components may be used in conjunction with computer system/server 502. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices, which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing storage volumes of a storage system, comprising:
   a process for determining, by a volume placement module, offset locations in a storage space comprised of a plurality of storage devices in the storage system for placement of a storage volume to be stored across the storage devices, wherein the storage volume can be placed starting at the determined offset locations;
   calculating, by the volume placement module, a utilization histogram representing a current volume allocation within the storage space; and
   a process for selecting, by the volume placement module, one of the determined offset locations to optimize utilization of allocated storage space, wherein the selecting includes evaluating selection criteria used to evaluate each of the determined offset locations in the utilization histogram based on the current volume allocation within the storage space, wherein the selection criteria includes at least one of:
   a process for preventing peaks of storage blocks in the utilization histogram;
   a process for reducing a number of edges between storage blocks in the utilization histogram; and
   a process for filling a lowest unallocated storage space in the utilization histogram.

2. The computer program product of claim 1, wherein the volume placement module further includes a process for initiating volume placement at the selected offset location of the storage space.

3. The computer program product of claim 1, wherein the selection criteria includes all of:
the process for preventing peaks of storage blocks in the utilization histogram;
the process for reducing a number of edges between storage blocks in the utilization histogram; and
the process for filling a lowest unallocated storage space in the utilization histogram.

4. A system for managing storage volumes of a storage system, comprising:
a processor; and
a memory for executing processes of a manager module, wherein the manager module
determines offset locations in a storage space comprised of a plurality of storage devices in the storage system for placement of a storage volume to be stored across the storage devices, wherein the storage volume can be placed starting at the determined offset locations;
calculates a utilization histogram representing a current volume allocation within the storage space; and
selects one of the determined offset locations to optimize utilization of allocated storage space, wherein the selecting one of the determined offset locations includes evaluating selection criteria to evaluate each of the determined offset locations in the utilization histogram based on the current volume allocation within the storage space, wherein the selection criteria includes at least one of:
a process for preventing peaks of storage blocks in the utilization histogram;
a process for reducing a number of edges between storage blocks in the utilization histogram; and
a process for filling a lowest unallocated storage space in the utilization histogram.

5. The system of claim 4, wherein the manager module further includes a process for initiating volume placement at the selected offset location of the storage space.

6. The system of claim 4, wherein the selection criteria includes all of:
the process for preventing peaks of storage blocks in the utilization histogram;
the process for reducing a number of edges between storage blocks in the utilization histogram; and
the process for filling a lowest unallocated storage space in the utilization histogram.

7. The system of claim 4, wherein allocated storage space includes at least one stripe having at least one allocated volume, the allocated volume being partitioned into data blocks.

8. A method for managing storage volumes of a storage system, comprising:
determining, by a volume placement module, offset locations in a storage space comprised of a plurality of storage devices in the storage system for placement of a storage volume to be stored across the storage devices, wherein the storage volume can be placed starting at the determined offset locations;
calculating, by the volume placement module, a utilization histogram representing a current volume allocation within the storage space; and
selecting, by the volume placement module, one of the determined offset locations to optimize utilization of allocated storage space, wherein the selecting includes evaluating selection criteria to evaluate each of the determined offset locations in the utilization histogram based on the current volume allocation within the storage space, wherein the selection criteria includes at least one of:
a process for preventing peaks of storage blocks in the utilization histogram;
a process for reducing a number of edges between storage blocks in the utilization histogram; and
a process for filling a lowest unallocated storage space in the utilization histogram.

9. The method of claim 8, wherein the volume placement module further includes a process for initiating volume placement at the selected offset location of the storage space.

10. The method of claim 8, wherein the selection criteria includes all of:
the process for preventing peaks of storage blocks in the utilization histogram;
the process for reducing a number of edges between storage blocks in the utilization histogram; and
the process for filling a lowest unallocated storage space in the utilization histogram.

11. The method of claim 8, wherein allocated storage space includes at least one stripe having at least one allocated volume, the allocated volume being partitioned into data blocks.

12. The computer program product of claim 1, wherein the offset locations are defined by a row and offset within the row of a data block within a utilization histogram of data blocks at which to start the storage volume, wherein the utilization histogram illustrates a logical allocation of previously allocated blocks within gaps.

13. The system of claim 4, wherein the offset locations are defined by a row and offset within the row of a data block within a utilization histogram of data blocks at which to start the storage volume, wherein the utilization histogram illustrates a logical allocation of previously allocated blocks within gaps.

14. The method of claim 9, wherein the offset locations are defined by a row and offset within the row of a data block within a utilization histogram of data blocks at which to start the storage volume, wherein the utilization histogram illustrates a logical allocation of previously allocated blocks within gaps.

* * * * *